(12) United States Patent
Lee

(10) Patent No.: US 6,839,499 B1
(45) Date of Patent: Jan. 4, 2005

(54) METHOD AND APPARATUS FOR PRESERVING MONITORED VIDEO SIGNALS

(75) Inventor: Chang-Joo Lee, Kyunggido (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/260,054

(22) Filed: Mar. 2, 1999

(30) Foreign Application Priority Data

Jun. 19, 1998 (KR) .............................. 98-23795

(51) Int. Cl.$^7$ .............................. H04N 5/91; H04N 7/00

(52) U.S. Cl. .......................................... 386/46; 386/81

(58) Field of Search ............................. 386/45–46, 81, 386/125–126, 96, 117; 360/7, 99.02, 99.06, 99.07; 369/60.01, 69; 348/96

(56) References Cited

U.S. PATENT DOCUMENTS

| | | | | |
|---|---|---|---|---|
| 5,239,426 A | * | 8/1993 | Sakaegi | 360/69 |
| 5,257,142 A | * | 10/1993 | Hong | 386/46 |
| 5,345,430 A | * | 9/1994 | Moe | 360/7 |
| 6,195,120 B1 | * | 2/2001 | Kodama | 348/96 |
| 6,249,313 B1 | * | 6/2001 | Nishi | 386/117 |

* cited by examiner

Primary Examiner—Thai Tran
Assistant Examiner—Christopher Onuaku
(74) Attorney, Agent, or Firm—Birch, Stewart, Kolasch & Birch, LLP (57) ABSTRACT

The method and apparatus for preserving video signals receives an instruction to eject the recording medium from the recording/reproducing apparatus and/or senses when the recording medium is removed from the recording/reproducing apparatus. In either event, the video data stored in a memory of the recording/reproducing apparatus is preserved. Later, when a new recording medium is loaded into the recording/reproducing apparatus, the stored video data is recorded on the new recording medium in response to an operator's manual.

28 Claims, 9 Drawing Sheets

METHOD AND APPARATUS FOR PRESERVING MONITORED VIDEO SIGNALS

BACKGROUND OF THE INVENTION

1. Field of the Invention

The present invention relates to an apparatus and method for preserving/recording video signals in a video recording/reproducing apparatus such as a video cassette recorder (VCR). More specifically, the present invention relates to an apparatus and method for preserving/recording video signals to be recorded in a time-lapse VCR that makes it possible to preserve video signals written in a memory before a recording medium is forcibly ejected or ejected without proper authorization, and to record the preserved video signals on a recording medium inserted thereafter.

2. Brief Description of the Prior Art

Figure 9:
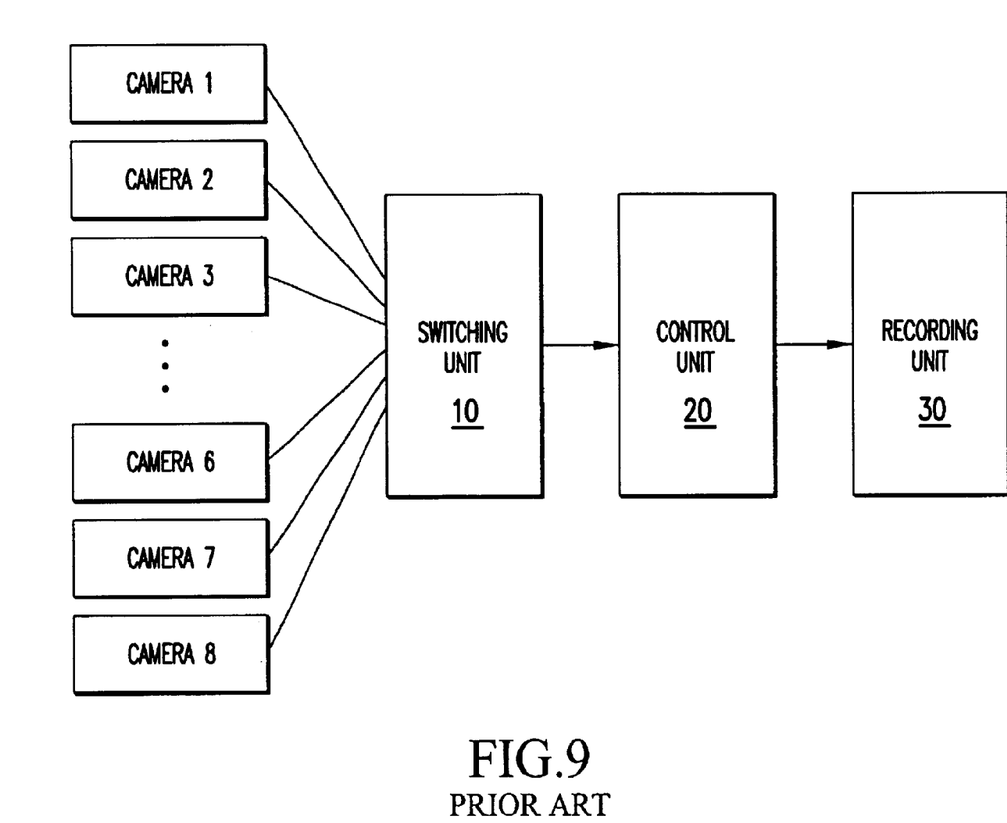
FIG. 9 shows a block diagram of a conventional time-lapse VCR.

Unlike an ordinary continuous VCR which records every frame of video signals, a time-lapse VCR records intermittently records frames of video signals from several video cameras or the like on a recording medium, e.g., a magnetic tape with a pre-selected regular interval. The time-lapse VCR is often used in security applications requiring long-time recording such as the monitoring of a bank or a museum. As shown in FIG. 9, a time-lapse VCR comprises a switching unit 10 which selects a video signal from among video signals received from several video cameras; a control unit 20 which extracts one frame intermittently from the continuous video signal received from the switching unit 10; and a recording unit 30 which records the video signal received from the control unit 20 on tracks on a magnetic tape. The recording unit 30 comprises a video signal processing unit and mechanical elements such as a loading motor which moves a loading post to load/unload the magnetic tape; a drum motor which rotates a head drum onto which video heads are mounted to record/reproduce a video signal on the magnetic tape; a capstan motor which rotates a capstan shaft to move the magnetic tape at a designated tape running speed.

For example, if a tape of 2 hours running time is used for recording during 48 hours, then the switching unit 10 switches to connect to the next video camera at an interval of 24 frames (=48 hours/2 hours), receives a video signal from the connected video camera, and sends the received video signal to the control unit 20. Then, the control unit 20 extracts one frame out of the video signal being received from the switching unit 10 at a specific point in time, and the extracted frame is recorded on the tape while the tape is advanced one frame by the capstan motor.

A time-lapse VCR has been one of the important components in most security monitoring systems because it enables recordation of video signals received from video cameras installed in several sites over a long time on one recording medium.

In the prior art, however, if an intruder destroys or takes out the recording medium having the recorded video signals thereon, the time-lapse VCR loses the capability to monitor the intrusion or emergency.

SUMMARY OF THE INVENTION

One objective, among others, of the present invention is to solve the above mentioned problems of the prior art, and to provide an apparatus and method which preserves video signals of a video recording/reproducing apparatus before a recording medium loaded in the video recording/reproducing apparatus is stolen or destroyed, and to record the preserved video signals when a new recording medium is loaded thereafter.

These and other objectives are achieved by a method for preserving video signals in a recording/reproducing apparatus, comprising receiving user input instructing to eject a recording medium from the recording/reproducing apparatus; and preserving video data stored in a memory of the recording/reproducing apparatus when user input instructing to eject the recording medium is received.

These and other objectives are further achieved by a method for preserving video signals in a recording/reproducing apparatus, comprising sensing removal of a recording medium from the recording/reproducing apparatus; and preserving video data stored in a memory of the recording/reproducing apparatus when the sensing step senses the removal of the recording medium.

These and other objectives are still further achieved by an apparatus for preserving video signals in a recording/reproducing apparatus, comprising a memory for storing video data; a user input device receiving user input instructing to eject a recording medium in the recording/reproducing apparatus; and a controller preserving video data stored in the memory when user input instructing to eject the recording medium is received.

These and other objectives are also achieved by an apparatus for preserving video signals in a recording/reproducing apparatus, comprising a memory for storing video data; a sensor sensing removal of a recording medium from the recording/reproducing apparatus; and a controller preserving video data stored in the memory when the sensor senses the removal of the recording medium.

The above objectives, features, and advantages of the present invention will become apparent from the following detailed description of illustrative embodiments thereof to read in conjunction with the accompanying drawings.

BRIEF DESCRIPTION OF THE DRAWINGS

The accompanying drawings, which are included to provide a further understanding of the invention, illustrate preferred embodiments of this invention, and together with the description, serve to explain the principles of the present invention.

In the drawings.

DETAILED DESCRIPTION OF THE PREFERRED EMBODIMENTS

The apparatus and method for preserving/recording video signals in a time-lapse VCR according to the present invention is described below in detail with reference to schematic diagrams shown in FIGS. 1, 4, and 6 and the flow charts of FIGS. 3, 5, 7, and 8.

Figure 1:
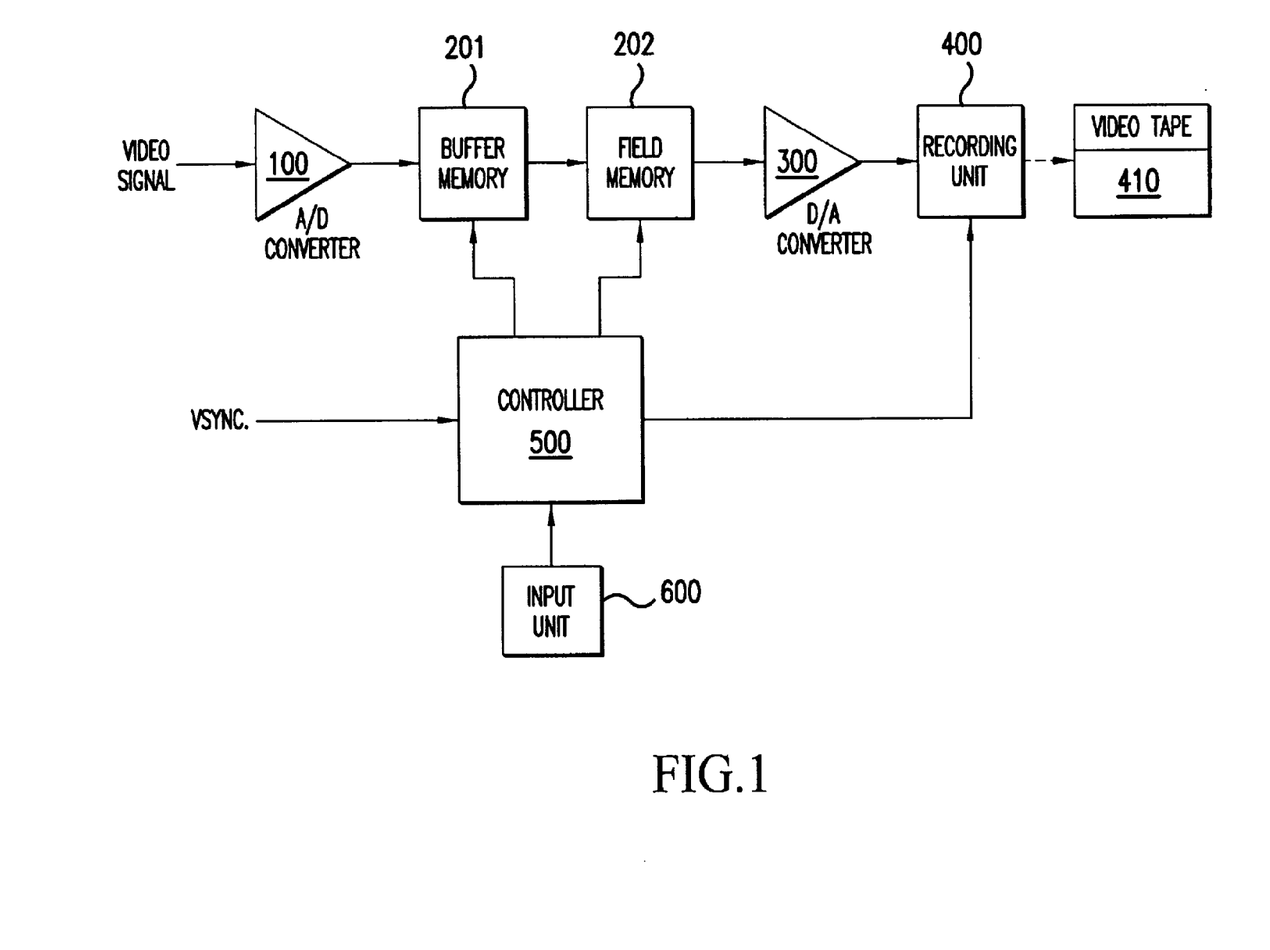
FIG. 1 is a schematic diagram showing a time lapse video cassette recorder (VCR) for preserving/recording video signals according to a first embodiment of the present invention.

FIG. 1 shows a first embodiment of the apparatus for preserving/recording video signals in a time-lapse VCR according to the present invention. As shown, the time-lapse VCR includes an A/D converter 100 which converts an analog video signal received from a selected external video camera into a digital data stream; a buffer memory 201 in which the converted digital video frames are stored temporarily; a field memory 202 in which the video frames, which are selected from the buffer memory 201 every predetermined number of frames, are stored before recording; a D/A converter 300 which converts the video frames in the field memory 202 into analog video signals; a recording unit 400 which records the analog video signals on a tape 410; a controller 500 which controls the field memory 202 to preserve the video frames when the tape is ejected, to record them when a memory dump instruction is inputted by a user via an input unit 600 after a new tape is loaded, and to control writing/reading of video signals to/from the memories 201 and 202; and the input unit 600 which receives operator input.

A method for preserving/recording video signals in the time-lapse VCR of FIG. 1 according to the present invention is described in detail with reference to FIG. 2 and the flow chart of FIG. 3.

Figure 3:
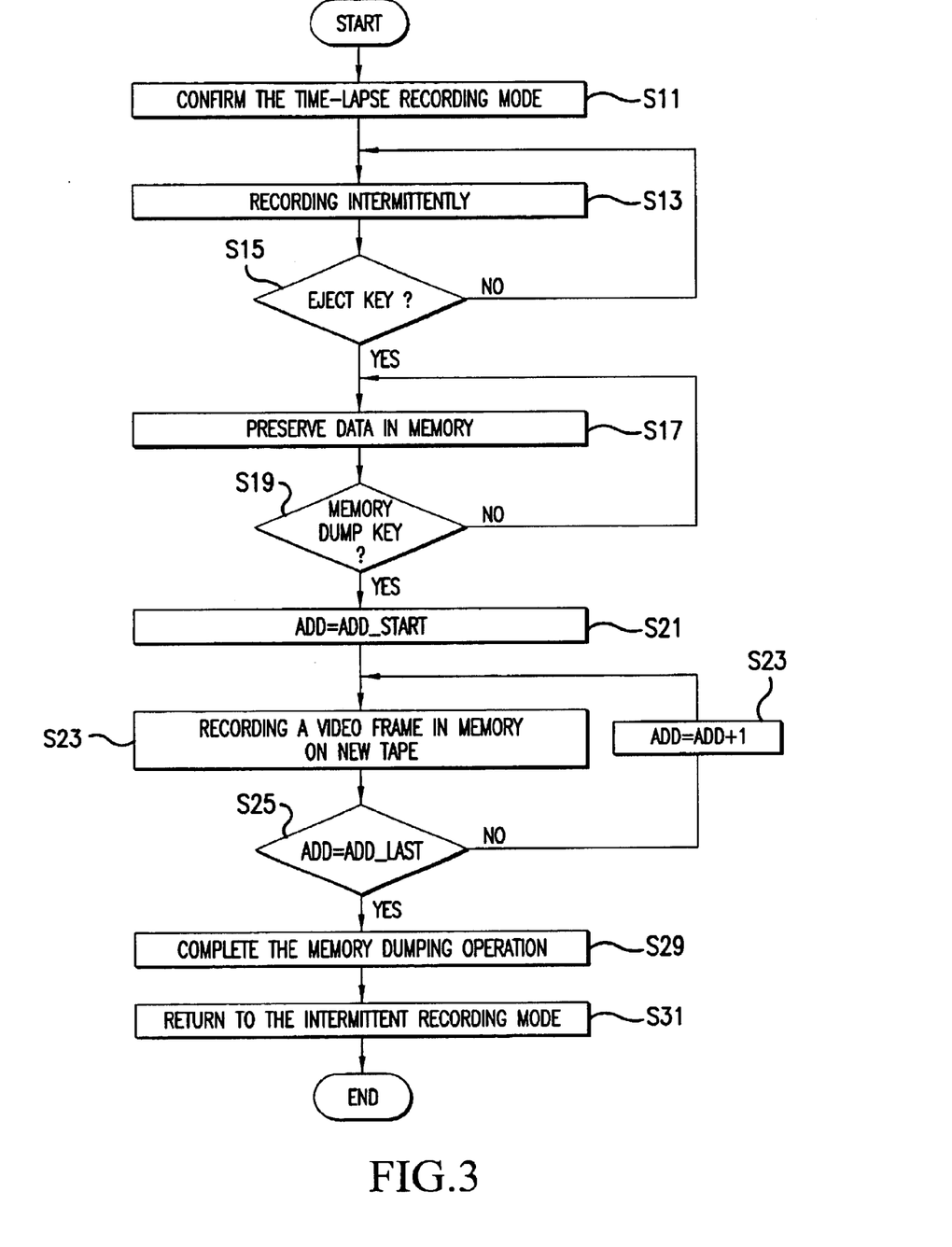
FIG. 3 is a flow chart of a method for preserving/recording video signal in the time-lapse VCR of FIG. 1 according to the present invention.

Referring to FIG. 3, when a total time-lapse recording time is set by a user (S11), a recording pause period, where a recording operation is suspended till the subsequent recording, is calculated, and the intermittent recording operation begins (S13). The recording pause period is calculated in the following way. For an illustration showing how to calculate the recording pause period, suppose that the normal running time of a tape is 2 hours and the storage capacity of the field memory 202 is 150 frames, which corresponds to 5 seconds in view of a normal reproduction time.

In the case of continuous recording with no interval between frames to be recorded, a video signal from an external video camera is digitized continuously by the A/D converter 100 and is then written in the field memory 202 via the buffer memory 201 without missing of any frame.

When the number of video frames that have been successively written in the field memory 202 becomes equal to the capacity of the field memory 202, i.e., 150 frames, the video frames in the field memory 202 are converted into analog signals by the D/A converter 300 and are then recorded on the tape. While the video frames are recorded, the video signal received from one of the external video cameras is written temporarily in the buffer memory 201. Therefore, when the recording of 150 frames in the field memory 202 is completed, the buffer memory 201 becomes full with 150 video frames. As soon as they are transferred to the field memory 202, they are recorded. Thus, the video signal, which is received in real time from an external video camera, is stored with some delay but the recording pause does not occur.

On the other hand, if a total time-lapse recording time of 72 hours is set by a user, or if the user intends to record video signals received from several external video cameras during 72 hours with a tape of 2 hours running time, a frame of video signal should be recorded every 36 frames. In other words, one frame out of every successive 36 frames that have been written in the buffer memory 201 ('A' of FIG. 2) is transferred to the field memory 202, as shown in FIG. 2.

Figure 2:
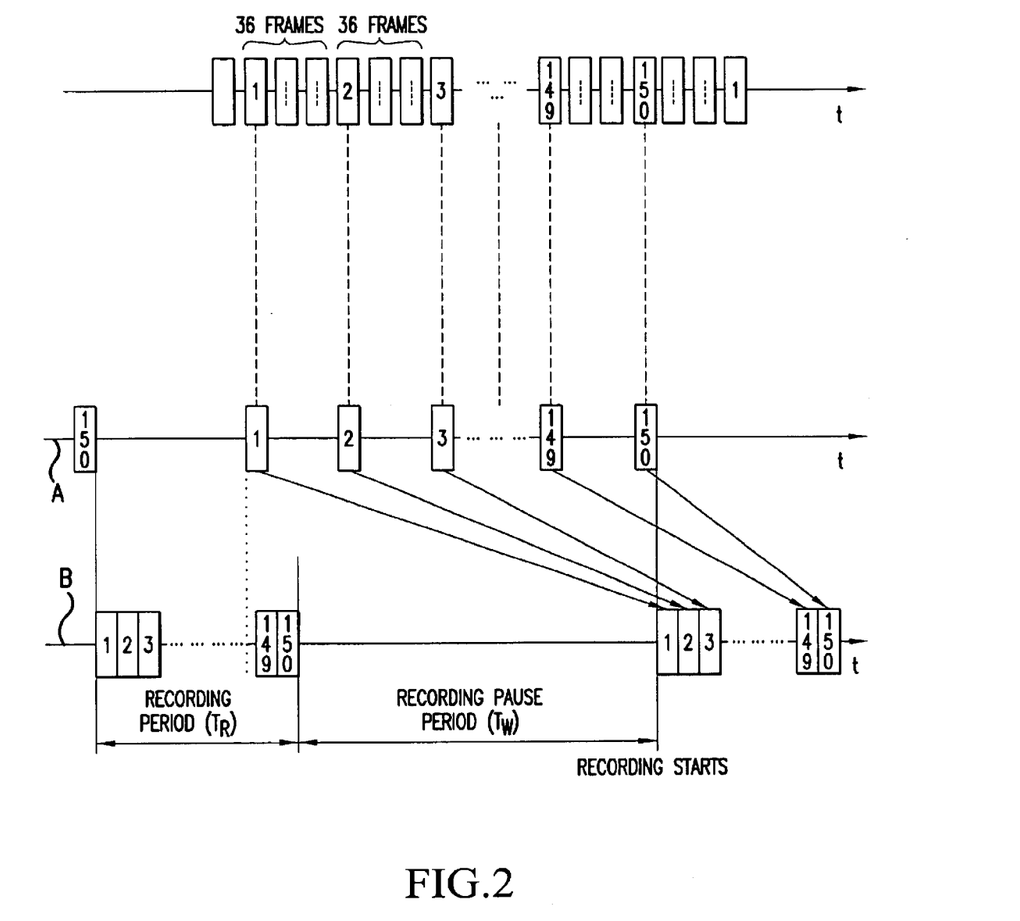
FIG. 2 is a diagram describing schematically the principle of the intermittent video recording of the time-lapse VCR of FIG. 1.

When the field memory 202 is filled with 150 frames, they are recorded on the tape under the recording control of the controller 500, as shown in 'B' of FIG. 2. Because three minutes corresponding to the 150×36 frames required to fill the field memory 202 and it takes 5 seconds to record the 150 frames with no interval, the recording pause period becomes 2 min. and 55 seconds.

Returning to FIG. 3, the controller 500 checks whether or not a tape eject instruction is inputted through an input unit 600 during the above-explained intermittent recording operation (S15). If the tape ejection instruction is not entered, the intermittent recording of the step S13 is repeated. Otherwise, the controller 500 stops generating reading/writing addresses for the field memory 202 maintains power to the field memory 202, using a backup battery (not shown) if necessary, so that the video frames in the field memory 202 are preserved (S17).

After that, if a new tape is inserted and a memory dump instruction inputted (S19), the controller 500 generates the reading address pointing the first video frame in the field memory 202 (S21) and makes the recording unit 400 start to record the preserved video frames on the new tape (S23).

Then, the controller 500 checks whether the reading address is the bottom address of the field memory 202 or not. If they are not equal, the reading address is increased by 1 (S27) and the steps of S21 and S23 are repeated. If they are equal, the memory dump operation, which means operation of recording the video frames in memory onto the tape, is completed (S29), and the intermittent recording operation resumes (S31).

With the apparatus and method according to this embodiment of the present invention, even if an intruder takes out the tape loaded in a deck of the time-lapse VCR by inputting an eject instruction, the images of the intruder's action prior to the tape ejection are available because video signals preserved in the field memory 202 can be recorded on a new tape.

Figure 4:
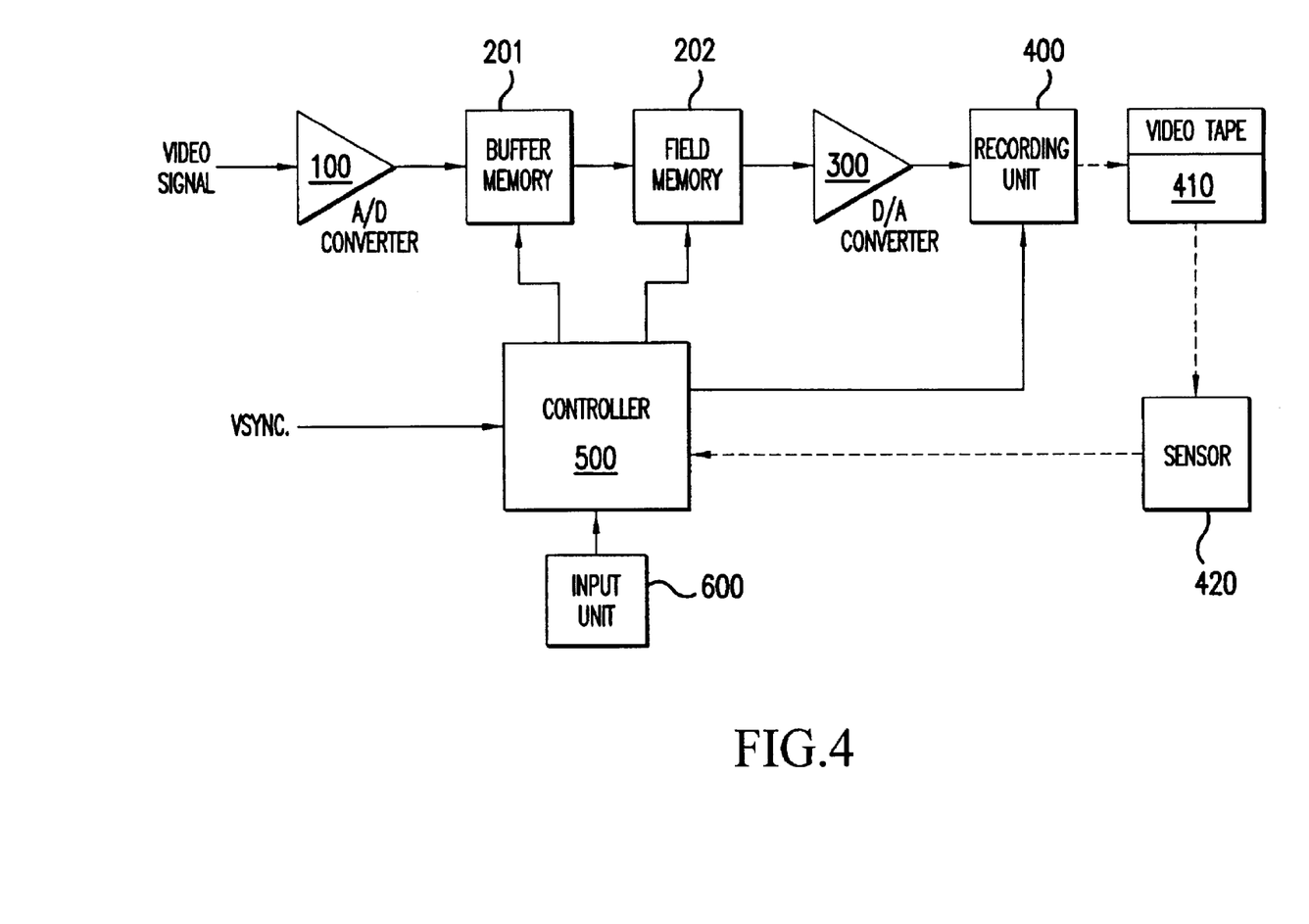
FIG. 4 is a schematic diagram showing a time lapse VCR for preserving/recording video signals in a time-lapse VCR according to a second embodiment of the present invention.

FIG. 4 shows an apparatus for preserving/recording video signals in a time-lapse VCR according to a second embodiment of the present invention which differs from the first embodiment of FIG. 1 in that a sensor 420 is installed to detect the presence of a tape 410.

There are various types of sensors 420 to detect the presence of the tape in a deck of the time-lapse VCR. For example, a limit switch for detecting a tape loading operation can be used. A pair of light emitting diode and light receiving diode can be positioned on the top and the bottom inside the deck of the time-lapse VCR, so that the light receiver on the top or bottom detects a light signal emitted from the emitting diode as soon as the loaded tape is ejected or forcibly removed.

Figure 5:
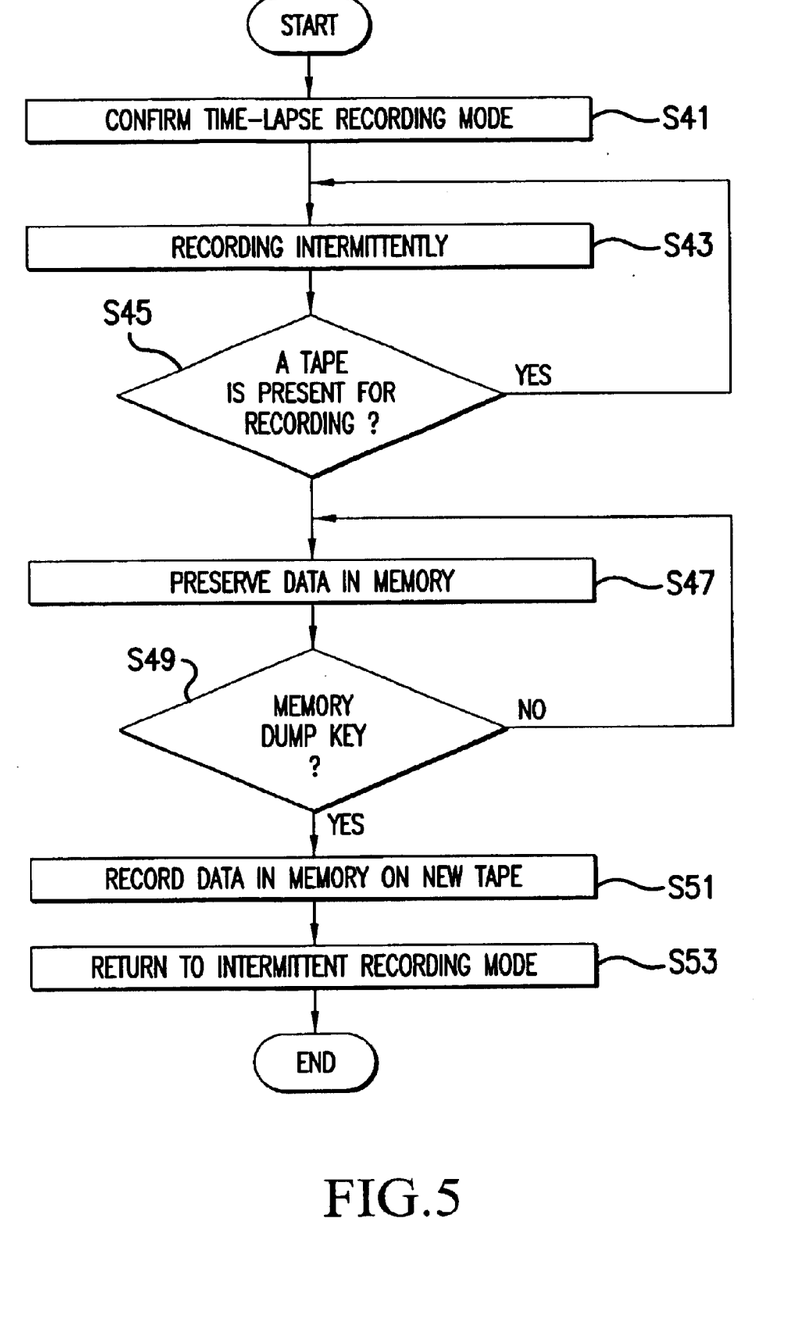
FIG. 5 is a flow chart of a method for preserving/recording video signals in the time-lapse VCR of FIG. 4 according to the present invention.

FIG. 5 shows a flow chart of a method for preserving/recording video signals in the time-lapse VCR of FIG. 4 according to the present invention. Through the same steps as those of FIG. 3, a recording pause period is calculated and then an intermittent recording operation starts (S41, S43).

During the recording operation, the controller 500 checks whether or not a tape is loaded based on a signal received from the sensor 420 (S45). When the tape is present in the deck, the intermittent recording operation is in progress. If the tape is not present, some operations are accomplished sequentially to preserve the video signal in the field memory 202 (S47). Specifically, the power supplied to the field memory 202 is maintained or backup power is supplied to the field memory 202 if power fails, and reading/writing data from/to the field memory 202 is inhibited.

After that, if an authorized manger enters a memory dump instruction through an input unit 600 after inserting a new tape (S49), the controller 500 records the video signal preserved in the field memory 202 on the tape through same steps of S21 to S29 of FIG. 3 (S51). Once the recording of the video signal in the field memory 202 is completed, the state of the time-lapse VCR returns to the intermittent recording mode (S53).

Even when an intruder forcibly take outs the loaded tape (i.e., not using an eject key) this embodiment of the present invention enables obtaining an intruder's image by reproducing the recorded video after recording the video signals in the field memory on a new tape.

On the other hand, although the foregoing embodiments of the present invention were described in the case of a time-lapse VCR with a field memory for buffering the intermittent video frames, the present invention can also be applied to a time-lapse VCR without such a field memory, which is described below in reference to FIG. 6 and the flow chart of FIG. 7.

Figure 6:
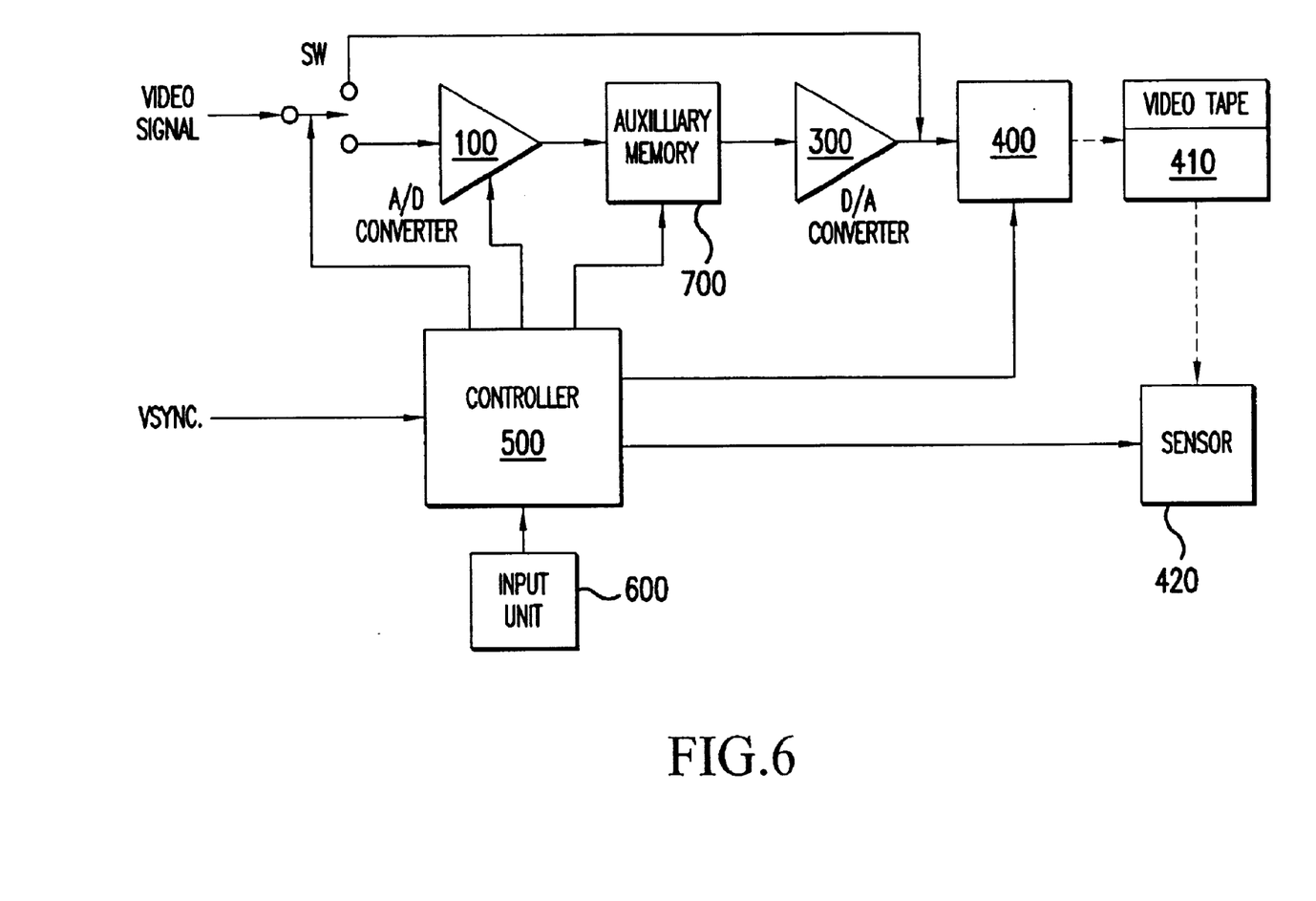
FIG. 6 is a schematic diagram showing a time lapse VCR for preserving/recording video signals according to a third embodiment of the present invention.

FIG. 6 shows an apparatus for preserving/recording video signals in a time-lapse VCR according to a third embodiment of the present invention which differs from the embodiment of FIG. 4 in that no field memory for buffering intermittent video signals is installed. Instead an auxiliary memory 700, which has a small storage capacity, replaces the buffer memory 201 and the field memory 202, and a switch SW to bypass the A/D converter 100, the auxiliary memory 700, and the D/A converter 300 has been added. The controller 500 controls the operation of both the auxiliary memory 700 and the switch SW. The auxiliary memory 700 prevents the video frames from being lost during the time it takes for an inserted tape to be loaded in a deck.

Figure 7:
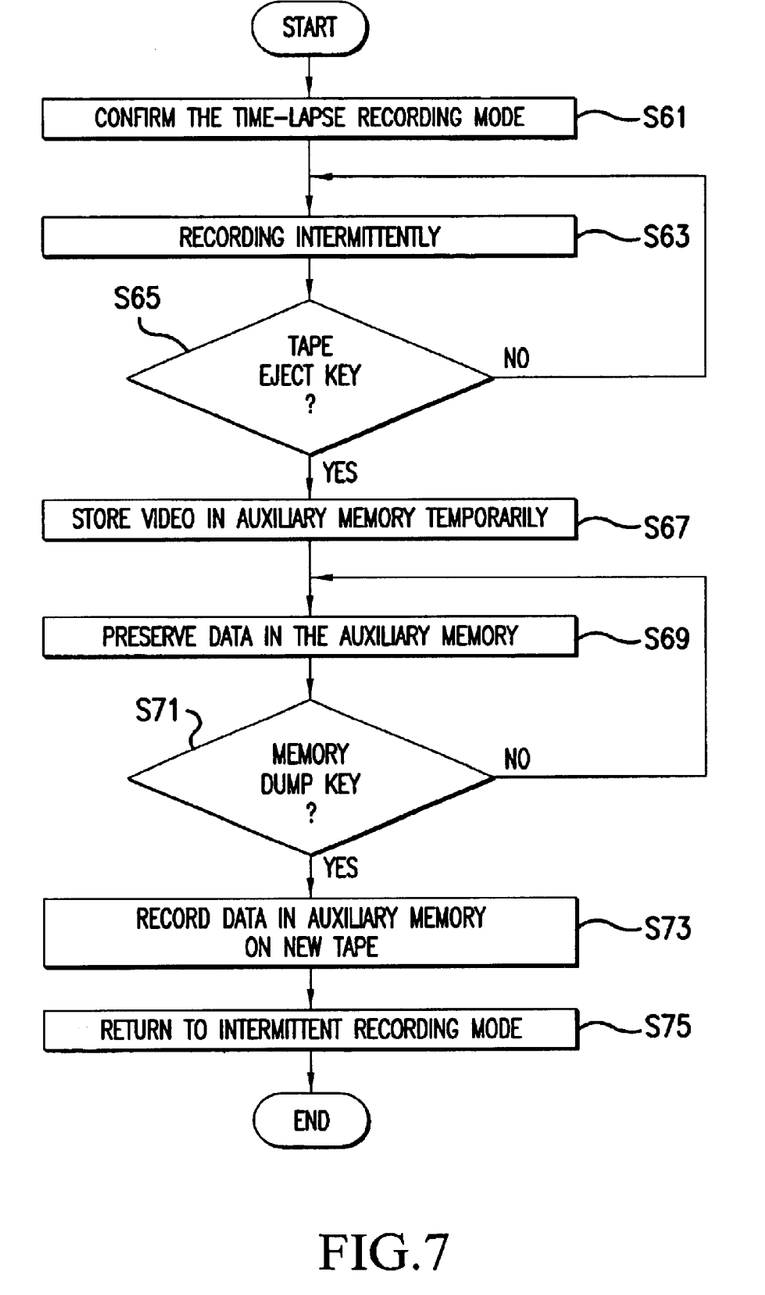
FIG. 7 is a flow chart of a method for preserving/recording video signals in the time-lapse VCR of FIG. 6 according to the present invention.

FIG. 7 shows a flow chart of a method for preserving/recording video signals in the time-lapse VCR of FIG. 6 according to the present invention. Given a total time-lapse recording time, the controller 500 calculates a recording pause period. Based on the recording pause period, the controller 500 controls the recording unit 400 to intermittently record video signal through the switch SW on a tape frame-by-frame in a conventional manner in which the tape advances frame by frame with some interval (S61, S63).

During the intermittent recording operation, if the loaded tape is ejected or removed, the controller 500 controls the signal path of the switch SW to become connected to the A/D converter 100, which selects a video frame at a pre-set interval under the control of the controller 500. The intermittently selected video frames are temporarily stored in the auxiliary memory 700 (S67).

If the auxiliary memory 700 becomes full with video frames obtained intermittently, the controller 500 preserves the data in the auxiliary memory 700 by maintaining the power supplied to the auxiliary memory 700 or by using a backup battery (not shown) (S69), and prevents video frames from being stored in the auxiliary memory 700 any more.

Then, if a new tape is inserted and a memory dump instruction is inputted (S71), the controller 500 makes the recording unit 400 record all the video signals in the auxiliary memory 700 on the new tape through the steps of S21 to S29 of FIG. 3 after the data streams are converted into corresponding analog video signals in the D/A converter 300 (S73). After the recording is completed, the memory dump operation is finished, and the controller 500 controls the switch SW to return to normal path for signal recording onto a tape directly and the intermittent recording mode resumes (S75).

With the apparatus and method according to this embodiment of the present invention, even when an intruder takes out the loaded tape by inputting an eject instruction, the images of the intruder are still available because the video signals preserved in the auxiliary memory 700 can be recorded on a new tape.

Figure 8:
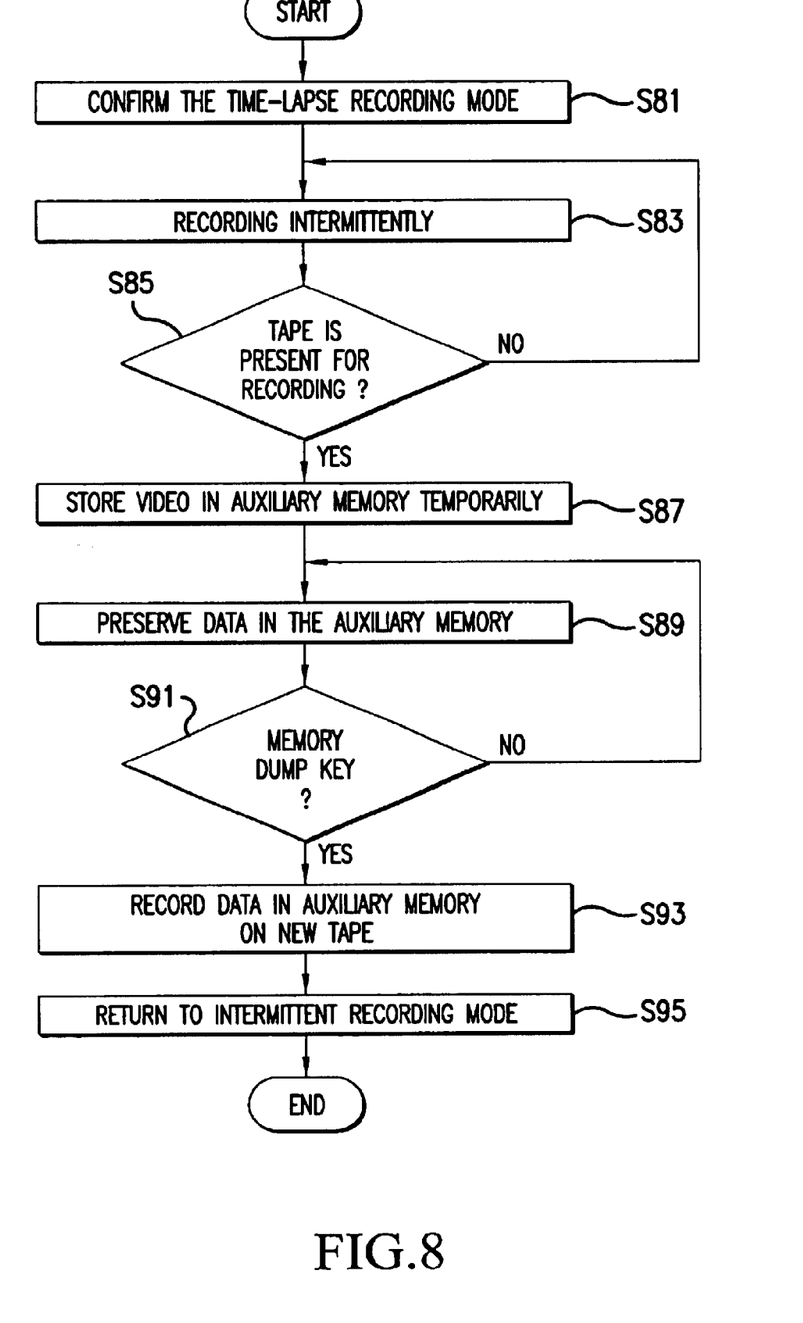
FIG. 8 is a flow chart of another method for preserving/recording video signals in the time-lapse VCR of FIG. 6 according to the present invention.

FIG. 8 shows a flow chart of another method for preserving/recording video signals in the time-lapse VCR of FIG. 6 according to the present invention. Given a total time-lapse recording time, a conventional intermittent recording is performed through the same steps as those of the flow chart of FIG. 7(S81, S83).

In the intermittent recording mode, the controller 500 checks whether or not a tape is present in the deck of the time-lapse VCR based on a signal from the sensor 420 (S85). If the tape is present, the intermittent recording mode is maintained. Otherwise, the switch SW is switched so that the video signals are diverted to the A/D converter 100, and then transferred to the auxiliary memory 700 (S87). The data in the auxiliary memory 700 is then preserved in the manner discussed above (S89). The steps of S91 through S95 are the same as those of S71 through S75 of FIG. 7.

When an intruder takes out the loaded tape forcibly, this embodiment of the present invention makes it possible to obtain the images of the intruder or intruders by recording the video signals preserved in an auxiliary memory on a new tape.

Although the foregoing embodiments of the present invention were described in the case where a video cassette tape is used as a recording medium, the present invention can be also applied to a time-lapse recording/reproducing apparatus which uses other recording mediums such as an optical disk and an optical magnetic disk.

The foregoing is provided only for the purpose of illustration and explanation of the preferred embodiments of the present invention, so changes, variations and modifications may be made without departing from the spirit and scope of the invention.

What is claimed is:

1. A method for storing a video signal inputted from at least one of a plurality of video sources in a memory and recording intermittently the stored video signal into a recording medium in a recording/reproducing apparatus, the method comprising the steps of:

storing the video signal in the memory;

checking if ejection of the recording medium from the recording/reproducing apparatus is detected;

preserving the stored video signal in the memory prior to said checking step if the recording medium is ejected from the recording/reproducing apparatus; and recording the preserved video signal in the memory into an other recording medium inserted in the recording/reproducing apparatus.

2. The method of claim 1, wherein the method stores the video signal in the memory until the memory is full.

3. The method of claim 1, wherein the other recording medium is a newly inserted recording medium.

4. The method of claim 1, wherein the recording step records the preserved video signal on the other recording medium upon receipt of a command from a user.

5. The method of claim 1, prior to the ejecting of the recording medium, further comprising:
intermittently recording the video signal on the recording medium; and
resuming the intermittent recording step after recording the preserved video signal.

6. The method of claim 1, wherein the recording medium is a magnetic tape.

7. The method of claim 1, wherein the other recording medium is a magnetic tape.

8. A method for storing a video signal inputted from at least one of a plurality of video sources in a memory and recording intermittently the stored video signal into a recording medium in a recording/reproducing apparatus, the method comprising the steps of:
storing the video signal in the memory;
checking if an eject instruction of the recording medium from the recording/reproducing apparatus is inputted;
preserving the stored video signal in the memory prior to said checking step if the eject instruction of the recording medium from the recording/reproducing apparatus is inputted; and
recording the preserved video signal in the memory into an other recording medium inserted in the recording/reproducing apparatus.

9. The method of claim 8, wherein the method stores the video signal in the memory until the memory is full.

10. The method of claim 8, wherein the other recording medium is a newly inserted recording medium.

11. The method of claim 8, wherein the recording step records the preserved video signal on the other recording medium upon receipt of a command from a user.

12. The method of claim 8, prior to the input of the eject instruction, further comprising:
intermittently recording the video signal on the recording medium; and
resuming the intermittent recording step after recording the preserved video signal.

13. The method of claim 8, wherein the recording medium is a magnetic tape.

14. The method of claim 8, wherein the other recording medium is a magnetic tape.

15. An apparatus for storing a video signal inputted from at least one of a plurality of video sources in a memory and recording intermittently the stored video signal into a recording medium in a recording/reproducing apparatus, the apparatus comprising:
a detector configured to detect ejection of the recording medium by a user from the recording/reproducing apparatus; and
a controller configured to record the video signal in the memory, preserve the stored video signal in the memory prior to said detection of ejection of the recording medium if the recording medium is ejected from the recording/reproducing apparatus and record the preserved video signal in the memory into an other recording medium inserted into the recording/reproducing apparatus.

16. The apparatus of claim 15, wherein the controller causes the memory to store the video signal until the memory is full.

17. The apparatus of claim 15, wherein the other recording medium is a newly inserted recording medium.

18. The apparatus of claim 15, wherein the controller record the preserved video signal on the other recording medium upon receipt of a command from a user.

19. The apparatus of claim 15, wherein
the controller controls to record intermittently video signal on the recording medium prior to the detector detecting the ejecting of the recording medium and to resume the intermittent recording operation after recording the preserved video signal.

20. The apparatus of claim 15, wherein the recording medium is a magnetic tape.

21. The apparatus of claim 15, wherein the other recording medium is a magnetic tape.

22. An apparatus for storing a video signal inputted from at least one of a plurality of video sources in a memory and recording intermittently the stored video signal into a recording medium in a recording/reproducing apparatus, the apparatus comprising:
a user input device instructing to eject the recording medium in the apparatus; and
a controller configured to store the video signal in the memory, and to preserve the stored video signal in the memory prior to said input of eject instruction if the user input instructing to eject the recording medium is received and the preserved video signal in the memory into an other recording medium inserted in the recording/reproducing apparatus.

23. The apparatus of claim 22, wherein the controller causes the memory to store the video signal until the memory is full.

24. The apparatus of claim 22, wherein the other recording medium is a newly inserted recording medium.

25. The apparatus of claim 22, wherein the controller controls to record the preserved video signal on the other recording medium upon receipt of a command from a user.

26. The apparatus of claim 22, wherein
the controller controls to record intermittently video signals on the recording medium prior to the detector detecting the ejecting of the recording medium and to resume the intermittent recording operation after recording the preserved video data.

27. The apparatus of claim 22, wherein the recording medium is a magnetic tape.

28. The apparatus of claim 22, wherein the other recording medium is a magnetic tape.

* * * * *